United States Patent [19]

Pettijohn

[11] Patent Number: 5,044,867

[45] Date of Patent: Sep. 3, 1991

[54] MOBILE HYDRAULIC CONVEYOR

[76] Inventor: Michael J. Pettijohn, 15111 Oak Rd., Carmel, Ind. 46032

[21] Appl. No.: 549,071

[22] Filed: Jul. 6, 1990

[51] Int. Cl.$^5$ .............................................. B60P 1/36
[52] U.S. Cl. ..................................... 414/523; 414/528; 414/489; 198/632; 198/313; 198/315; 198/861.4
[58] Field of Search ...................... 198/861.1, 313, 632, 198/315, 316.1, 317, 318, 861.4; 414/523, 489, 527, 528

[56] References Cited

U.S. PATENT DOCUMENTS

| | | | |
|---|---|---|---|
| 2,636,628 | 4/1953 | Prang | 414/489 |
| 2,834,487 | 5/1958 | Gaddis | 414/523 |
| 3,521,767 | 7/1970 | Rossi | 414/523 |
| 3,923,175 | 12/1975 | Landvatter | 414/523 X |
| 3,951,279 | 4/1976 | Jones | 414/523 |
| 4,253,256 | 3/1981 | Feliz | 414/489 X |

FOREIGN PATENT DOCUMENTS 671067  9/1963  Canada .................. 414/523

1592032  7/1981  United Kingdom ................ 414/523

Primary Examiner—Frank E. Werner
Attorney, Agent, or Firm—Richard C. Litman

[57] ABSTRACT

A conveyor apparatus that can be attached to the rear of a truck or the like. The conveyor belt apparatus of the present invention may be adjusted in both the vertical and horizontal plates either during operation or when at rest. This versatility in movement assures that the materials discharged by the conveyor are placed in specific locations. The conveyor is stored in the vertical position at the rear of the truck or vehicle to which it is attached. The speed of the motor on the conveyor apparatus may be adjusted to accommodate any number of applications. The whole apparatus is hydraulically controlled, and the hydraulics can be connected with the hydraulic system provided on a truck. The conveyor is provided with a cover to avoid injury to persons by stray particles. The cover also assures that materials will not be lost along the path to the end of the conveyor apparatus.

5 Claims, 2 Drawing Sheets

MOBILE HYDRAULIC CONVEYOR

BACKGROUND OF THE INVENTION

1. Field of the Invention

The present invention relates to conveyor belts. More specifically, the present invention relates to those types of conveyor belts that can be attached to the rear of a truck or similar vehicle to aid in the uniform disbursement of material therefrom. The present invention incorporates a hydraulically activated system in its design to accomplish the task of conveying material from the rear of a dump truck to a remote location. The speed of the conveyor belt can be adjusted such that the material is forcibly ejected from the belt to a specified location. The conveyor belt is designed such that it can be folded when not in use to a vertical position at the rear of the vehicle to which it is attached.

2. Description of the Prior Art

Several conveyor systems have been disclosed by the prior art. The discussion that follows recites a partial listing of the pertinent references. This discussion is included to provide a concise explanation of existing art. The references are also included in order to provide a basis upon which to discuss the improvements that are offered by the present invention. This list is by no means inclusive of all possible pertinent references.

U.S. Pat. No. 2,609,115 issued to E. Oklejas on Sept. 2, 1952 discloses a conveyor apparatus that can be attached to a truck or similar vehicle. The conveyor is extensible. It can be compressed when not in use to reduce the overall storage space required by the apparatus. The conveyor system is composed of two separate conveyor belts disposed at different heights with respect to one another. The upper of the belts discharges its contents to the lower. The lower belt is used to disburse the material thereon to a specific location.

U.S. Pat. No. 2,831,487 issued to R. C. Gaddis on May 13, 1958 discloses a conveyor belt apparatus that is attached to the rear of a truck or similar vehicle. The Gaddis conveyor is similar to that taught by Oklejas. However, it improves the Oklejas design in that the conveyor, once unfolded, forms a single continuous belt. The use of a single belt improves the simplicity and functional applicability of the conveyor apparatus.

U.S. Pat. No. 3,122,251 issued to W. E. Gardipee on Feb. 25, 1964 discloses an unloading conveyor for dump trucks. The conveyor is attached to the rear of the truck. It utilizes the rear trap door of the truck to its advantage. When the trap door swings open, the material within the body of the truck is poured onto the conveyor. The conveyor then discharges the material in whatever direction needed.

Each of these patents do disclose a conveyor apparatus that is attached to the rear of a vehicle such as a truck. However, the prior art fails to disclose a number of features that the present invention addresses. It is in the combination of parts of the present invention that the present invention differs from and improves upon the prior art.

The present invention offers a conveyor apparatus that can be arcuately adjusted both in the horizontal and vertical planes. It is hydraulically activated and operated. As a result, it can provide sufficient motive force to the material there conveyed to project the material a considerable distance from the truck to which the conveyor is attached. The conveyor incorporates a means so that it maybe folded into a readily storable form. It is easily expanded to its usable position by hydraulic means.

SUMMARY OF THE INVENTION

Accordingly, it is an object of the present invention to provide a conveyor apparatus that can be attached to the rear of a vehicle such as a truck.

It is still another object of the present invention to provide a conveyor apparatus that can be adjusted with respect to its height from the ground.

It is another object of the present invention to provide a conveyor apparatus that can be adjusted with respect to its angular displacement from the plane created by the rear of the vehicle to which it is attached.

It is yet another object of the present invention to provide a conveyor apparatus that can be folded in half so that it can be readily and easily stored at the rear of the vehicle to which it is attached.

It is still another object of the present invention to provide a conveyor apparatus whose operation is hydraulically controlled.

It is a further object of the present invention to provide a conveyor apparatus that can utilize a hydraulic system of a dump truck or the like for its operation.

It is yet another object of the present invention to provide a conveyor apparatus that has an adjustable speed to control the flow of material carried by the apparatus.

It is another object of the present invention to provide a conveyor apparatus that can discharge material from its surface at a relatively high speed so that the conveyor length does not become prohibitive.

It is still another object of the present invention to provide a conveyor apparatus that is covered to prevent injury to individuals and to prevent inadvertent loss of materials carried by such an apparatus.

It is a further object of the present invention to provide a conveyor apparatus whose belt is a continuous band of material.

It is another object of the present invention to provide a conveyor apparatus that is easily manufactured.

It is still another object of the present invention to provide a conveyor apparatus that can be adapted to a truck or similar vehicle lacking such an apparatus.

It is yet another object of the present invention to provide a conveyor apparatus that can be manufactured along with the truck or similar vehicle.

With these and other objects in view which will more readily appear as the nature of the invention is better understood, the invention resides in the novel combination and arrangement of parts hereinafter more fully described and illustrated, with reference being made to the accompanying drawings.

BRIEF DESCRIPTION OF THE DRAWINGS

Similar reference characters designate corresponding parts throughout the various figures of the drawings.

DESCRIPTION OF THE PREFERRED EMBODIMENT

Figure 1:
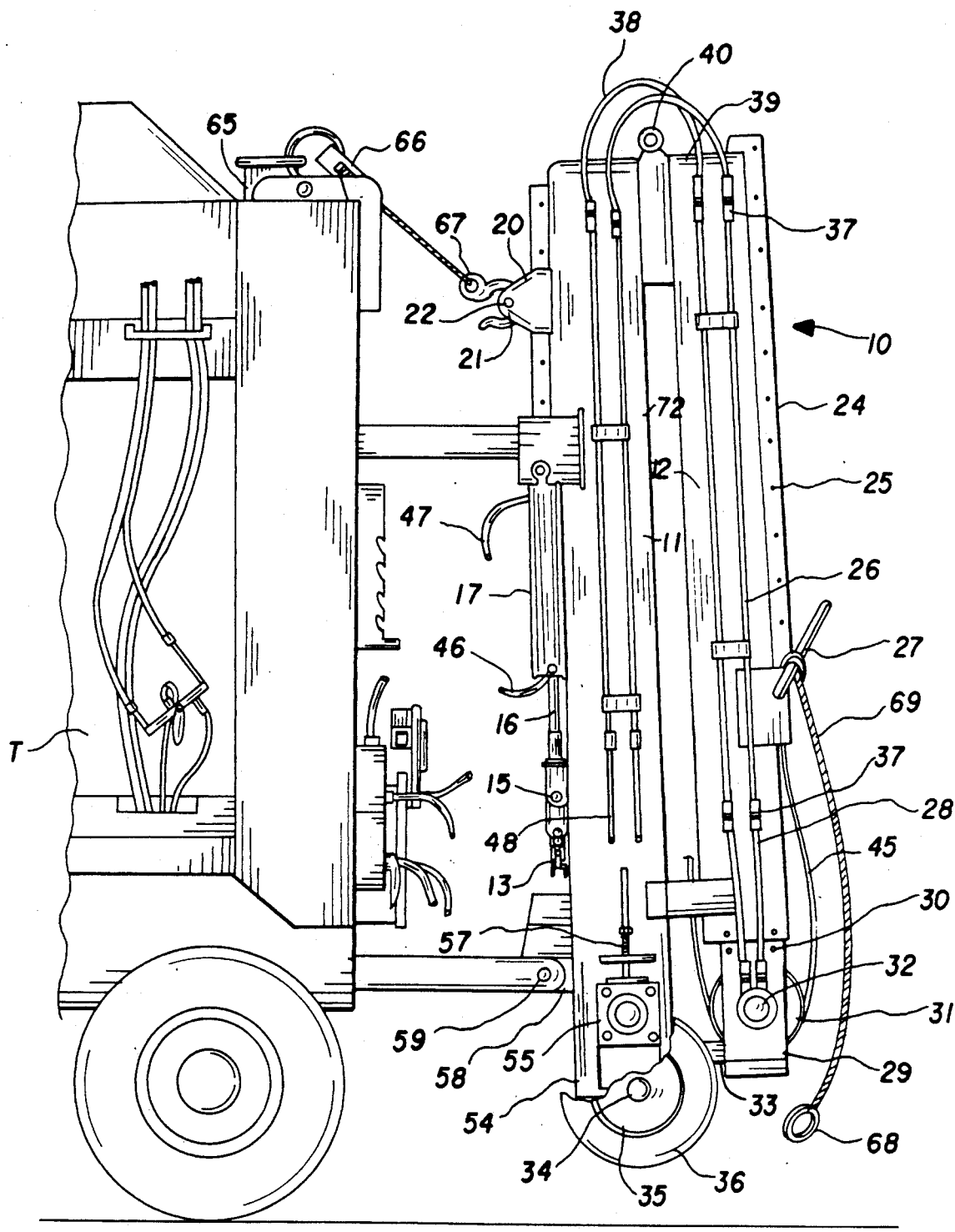
FIG. 1 is a perspective illustration of the conveyor apparatus of the present invention shown in the folded position behind a truck.
Figure 2:
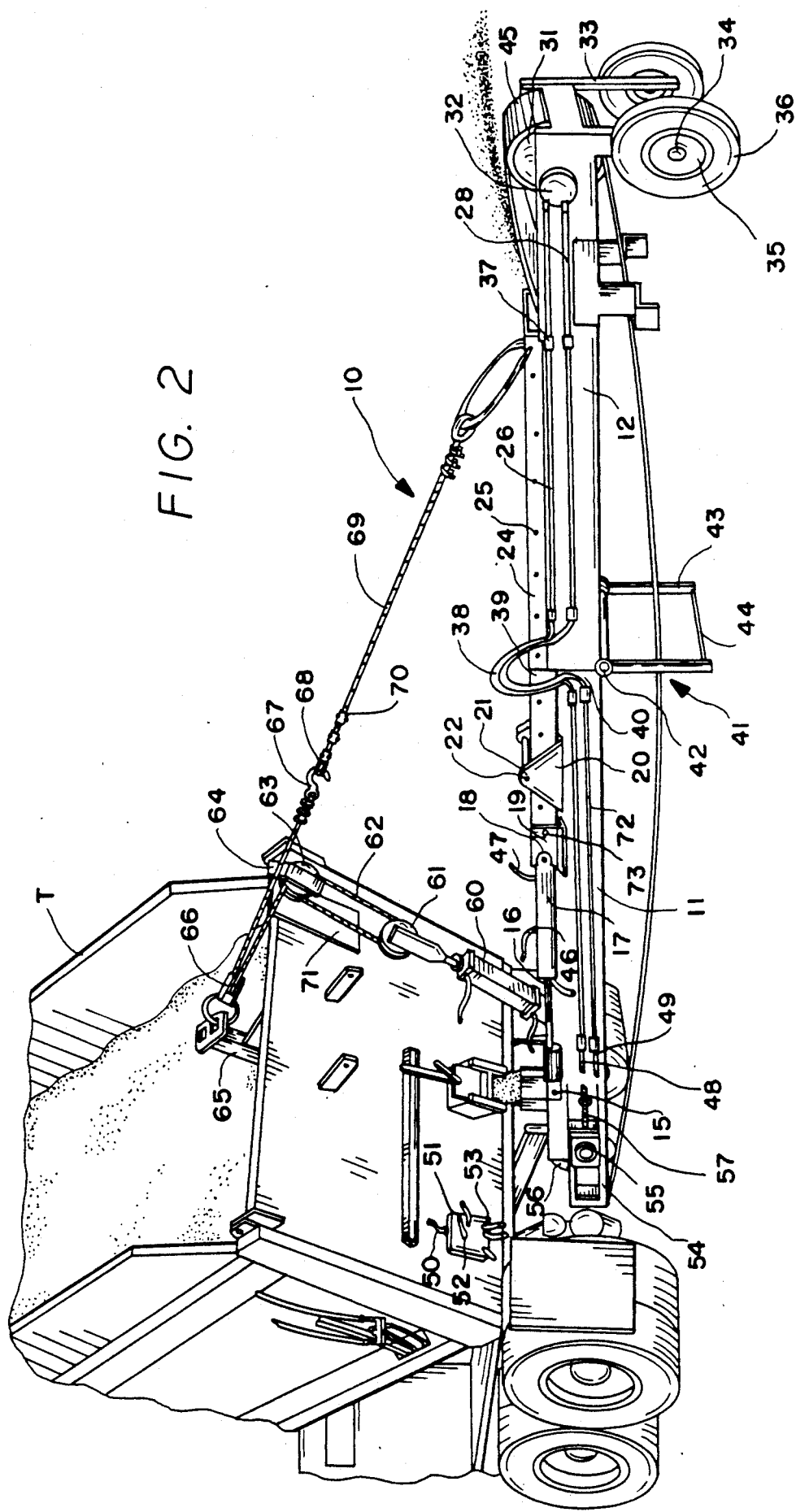
FIG. 2 is a perspective illustration of the conveyor apparatus of the present invention shown in the operating position.

The conveyor apparatus of the present invention is generally designated 10 in FIG. 1. The conveyor apparatus 10 is essentially composed of two main structural members, the attached structural tray 11 and the foldable structural tray 12. The attached structural tray 11 is the half of the conveyor apparatus 10 that attaches to the truck T or similar vehichle. A truck T is shown throughout the various figures of the drawings as it is the most amenable means for the use of the conveyor apparatus 10. The foldable structural tray 12 attaches at a pivot or folding joint 39 approximately at the mid point of the conveyor apparatus 10.

The structural trays 11, 12 are composed each of two side I-beam members 72. Thus, there are at least four I-beam members 72 that compose the conveyor apparatus 10 of the present invention. At least two I-beam 72 members form the sides of one of the structural trays 11, 12. The I-beam members 72 are laterally disposed adjacent one another. They form the sides of the conveyor apparatus 10 and provide a rigid structural support for the various components of the conveyor apparatus 10.

The attached structural tray 11 attaches to the truck T by means of two connection plates 58. An eyelet 59 is bored through the connection plates 58 wherein a pin is threaded. The connection plates 58 connect to a pivotal joint attached to the truck T via the connection pin disposed between the connection plates 58. The pivotal joint (not shown) allows the conveyor apparatus 10 to move laterally from the rear of the truck T. The connection plates 58 are attached near the ends of the I-beams 72 that form the attached structural tray 11. Thus, the connection plates 58 can and do support some of the weight of the conveyor apparatus 10.

The end of the attached structural tray 11 near the truck T has a structural extension 54. The structural extension 54 is composed of two plates laterally spaced from one another and connecting slidably with the I-beams 72 of the attached structural tray 11. The structural extension 54 has an end roller 56 for the conveyor belt 45. The end roller 56 connects at its ends to the side bars of the structural extension 54 by means of a bearing 55. The bearing 55 is attached to the side bars of the structural extension 54 to provide a rigid attachment for the end roller 56.

The side bars of the structural extension 54 are held rigidly in place by and adjustment means 57. The adjustment means 57 is a combination of parts that supplies sufficient tension on the conveyor belt 45. It is also adjustable so that the tension can be varied. This is essential as the conveyor belt 45 will stretch during use. The conveyor belt 45 will also lose some of its elasticity as it ages. As a result, the tension on the belt 45 will need to be adjusted to compensate for this loss.

Two side hydraulic cylinders 17 are attached to the I-beams 72 of the attached structural tray 11. The side hydraulic cylinders 17 are attached each to one I-beam 72. The side cylinders 17 attach to a structural attachment plate 19 located one on each side of the attached structural tray 11. The side hydraulic cylinders 17 attach to the attachment plate 19 via an eyelet arrangement 18. The eyelet arrangement 18 is pivotally affixed to the attachment plate 19 to compensate for any vertical displacement of the conveyor apparatus 10.

The attachment plates 19 are connected to one another across the attached structural tray 11 via a connecting pin 73. The connecting pin 73 gives the attachment plates 19 some structural rigidity. The connection pin 73 also serves to keep the attachment plates 19 aligned parallel to one another, and it prevents warping of the attachment plates 19 when the side hydraulic cylinders 17 are activated.

The side hydraulic cylinders 17 have each a cylinder piston 16 extending from the unattached end. The pistons 16 have eyelets 15 attached to their respective ends. The eyelets connect to chains 13 which connect to the turret 58 which is connected to the truck T. The attachment of the side hydraulic cylinders 17 to the truck T provides the means by which the conveyor apparatus may be moved in a lateral fashion.

By applying hydraulic pressure to one of the cylinders 17 to cause the piston 16 to retract into the cylinder 17, the length between the conveyor 10 and the truck T on one of the sides of the attached structural tray 11 is shortened. Simultaneously, the pressure in the opposing cylinder 17 is decreased to extend the length of the piston 16 and compensate for the change in arcuate position of the conveyor 10. The final result of this motion is to change the overall angular position of the conveyor 11. Thus, by changing the pressures of the cylinders 17, the direction in which the conveyor 10 is pointing can be easily changed. In other words, by increasing the pressure in one of the side cylinders 17, the piston 16 is drawn into the housing of the cylinder 17. As a result, the piston 16 pulls on the chain 13. In this manner, the arcuate position of the apparatus 10 is changed.

A plate 20 is also provided on each side of the attached structural tray 11. The plate 20 is simply a rigid plate extending from the exterior surface of the I-beam 72 of the tray 11. The plate 20 contains an eyelet 21 through which a connecting rod 22 passes. The connecting rod 22 connects the plates 20 together. The connecting rod 22 is used to fold the conveyor 10 and hold it in its folded position behind the truck T by means of hook 67 slipping around the rod 22.

The end of the attached structural tray 11 marks the point of the beginning of the folding structural tray 12. At the connection between these structural trays, 11 and 12, there is a folding joint 39. The folding joint 39 comprising a pivoting hinge 40 allows the two structural trays, 11 and 12, to fold onto one another from a straight operating position.

The folding structural tray 12 is constructed in much the same fashion as the attached structural tray 11. Two I-beams 72 form the sides of the structural tray 12. At the end opposite that connected to the folding joint 39 is the motorized conveyor roller 31. The motorized roller 31 is connected to a structural extension 29 which is attached to the end of the structural tray 12. The motorized roller 31 is powered by hydraulic fluid via a hydraulic motor 32.

Thus, the motorized roller 31 provides the motive force for the conveyor belt 45 and the materials placed thereon for dispersion. The motorized roller 31 is attached to the hydraulic motor 32 by means of a roller bearing. Rivets 30 connect the structural extension 29 to the structural tray 12.

Extending downward from the end of the structural extension 29 is a leg extension 33. The leg extension 33 is provided as a means to attach the tires 36 to the conveyor apparatus 10. At the base of the leg extension 33, there is located a wheel axle 34. The wheel hub 35 is connected pivotally to the axle 34. The tire 36 is connected to the wheel hub 35. The tire 36 is provided at the end of the conveyor 10 to provide a support for the conveyor when it rests on the ground.

The pivotal assembly 42 allows the conveyor holding means 41 to rotate about a central axis. Therefore, the pivotal assembly 42 prevents the conveyor holding means 41 from damaging any of the other parts of the conveyor apparatus 10.

Two vertically extending conveyor holder frame members 43 extend downwardly from the pivotal assembly 42. Each of the frame members 43 extend from opposing sides of the hinge assembly 40. At the bottom most portion of the frame members 43, there is located a conveyor crossbar 44. The conveyor crossbar 44 extends from one frame member 43 to the other frame member 43 under the conveyor apparatus 10. The conveyor crossbar 44 holds the conveyor belt 45 in place and prevents it from touching the ground while in the folded position.

The conveyor holding means 41 functions both when the conveyor 10 is operating and when it is folded. However, it is designed specifically for when the conveyor 10 is folded. When the conveyor 10 is operating, the conveyor belt 45 may have some slack which causes the conveyor belt 45 to hang below the structural assemblies 11 and 12. The conveyor holding means 41 prevents the conveyor belt 45 from dragging on the ground. In this manner, the conveyor belt 45 is protected from excessively abrasive wear.

When the conveyor 10 is folded, the conveyor belt holding means 41 functions to its engineered capacity. The holder 41, pivoting from point 42, is drawn upwards into the apex formed by the structural trays 11 and 12. As a result, the holder 41 carries the conveyor belt 45 that hangs below the conveyor 10 to the apex with it. In this manner, the holder 41 prevents the conveyor belt 45 from dragging on the ground when the conveyor 10 is folded and the truck T is moving to a designated location.

In order to power the side hydraulic cylinders 17 and the motorized roller 31, it is necessary to provide a means to convey the hydraulic fluid to these components. The following is a description of the needed tubing.

A flexible motor supply tubing 48 connects to the hydraulic fluid supply on the truck T. The motor supply tubing 48 connects to the truck T via a motor supply connector 52 attached to the end of the motor supply tubing line 48. The motor supply tubing 48 connects to a rigid pipe 26 on the side of the attached structural tray 11 by a flexible to rigid tubing connector 37.

The rigid pipe 26 extends the length of the structural tray 11 where it terminates near the foldable joint 39. A flexible folding joint tube 38 extends from the rigid tube 26 on the structural tray 11 to a rigid pipe 26 on the structural tray 12. The rigid pipe 26 extends the length of the structural tray 12 where it terminates near the end of the tray 12. A flexible pipe 28 extends from the rigid pipe 26 on the structural tray 12 to the motorized roller 31.

From the motorized roller 31, a return flexible tube 28 extends to another rigid pipe 26 on the structural tray 12. The same path as the supply is followed by the return tubing. At the end of the rigid pipe 26 on the structural tray 11, a flexible motor hydraulic return tube 49 is attached. The return tube 49 is fitted with a return connector 53 so that it can be attached to the return hydraulic fluid reservoir on the truck T.

Each of the side cylinders 17 are also fitted with the appropriate supply and return lines as is the motorized roller 31. A hydraulic supply line 46 connects to the end of the side cylinder 17 closest to the truck T. A hydraulic fluid return tube 47 connects to the same area of the side cylinder 17. The hydraulic fluid supply line 46 to the side cylinders 17 is provided with a side cylinder supply tubing connector 50 to connect the supply line 46 to the supply reservoir on the truck T. The return line 47 from the side cylinder 17 is provided with a return tube connector 51 to connect the return fluid to the reservoir that would be mounted adjacent the cylinder 17.

The description of the components above completes the discussion of the parts associated with the conveyor belt 10 itself. However, there are additional components that are needed to provide versatile functioning of the conveyor 10. Namely, there is an additional hydraulic means provided that allows the conveyor 10 to be raised and lowered in an automatic fashion.

There is a height adjustment cylinder 60 attached to the truck T at its rear most portion. The height cylinder 60 is connected to the hydraulics on the truck T in much the same manner as the side cylinders 17 are. As a result, a discussion is omitted that describes this connection. The height cylinder 60 is vertically mounted to the rear of the truck T. It has a piston extending from its main body.

The height cylinder 60 is connected to a block and tackle arrangement 61, 63 also located at the rear of the truck T. The tackle block 53 is held fixed to the truck T by an attachment means 71. The block and tackle arrangement 61, 63 extends vertically from the height cylinder 60. The block and tackle arrangement 61, 63 is composed of two tackle blocks 61, 63 that each contain a plurality of pulleys 64 on them. A tackle cable 62 is threaded between the pulleys 64 of the tackle blocks 63, 61. One of the free ends of the tackle cable 62 attaches to the piston on the height cylinder 60. The other free end extends to a pulley 66 through which it is threaded. The incorporation of a block and tackle arrangement 61. The cable 62 ultimately supports the conveyor 10 in its vertically displaced position.

The pulley 66 through which the cable 62 from the block and tackle arrangement 61, 63 is threaded is used to change the direction of the cable 62 so that it can connect to the structural tray 12 of the conveyor 10. The loop 68 removably attaches to the structural tray 12 by means of a hook 27 provided on the tray 12 near the motorized roller 31. The pulley 66 is attached to a vertical pole 65 also attached to the rear of the truck T.

The cable 62 extends from the pulley 66 to a hook 67. The hook 67 hooks to a loop 68 of a fixed length of cable 69. The fixed length cable 69 has two loops 68, one at each end. The fixed length cable 69 is used for form the loops 68. Clamps 70 are used to form reliable loops 68 from the fixed length cable 69.

As a result of the incorporation of the height cylinder 60 on the truck T, the height of the conveyor 10 can be adjusted with the use of hydraulic fluid. When the pressure is increased in the hydraulic cylinder 60, it pulls on the tackle block 16. This, in turn, pulls on the cable 62 and thereby on the conveyor 10. As a result, the height of the conveyor is increased. When the pressure in the height cylinder 60 is decreased, so too is the height of the conveyor 10.

The motorized roller 31 operates through the pressure of the hydraulic fluid applied to it. When the hydraulic pressure is high, the roller 31 speed is high. As a result, the conveyor belt 45 velocity is also high. When the hydraulic pressure if low, so too is speed of the motorized roller 31. Thus, by controlling the pressure of the hydraulic supply to the roller 31, the speed of the conveyor belt 45 can be controlled. If the speed of the roller 31 is very fast, the material on the conveyor belt 45 will be discharged far from the end of the conveyor 10. Thus, the material on the conveyor 10 from the truck T can be spread or piled a good distance from the conveyor apparatus 10 itself.

It is now necessary to describe the manner in which the conveyor 10 may be folded about the folding joint 39. The hook 67 is removed from the loop 68 of the fixed length cable 69. The hook it attached to the crossbar 22. The height cylinder 60 is then activated to pull on the cable 62. In this manner, the structural tray 11 is drawn into a vertical position. Since the structural tray 12 is now unsupported, the tray 12 folds onto the tray 11 and also assumes a vertical position. Any suitable attachment means known to those skilled in the art may be used to hold the tray 12 fixed to tray 11 when the conveyor 10 has been drawn into the vertical position. To extend the conveyor 10 from the vertical position, the process is simply reversed.

A conveyor cover 24 is provided over the length of both the structural trays 11, 12. The cover 24 prevents the material on the conveyor belt 45 from being ejected before it reaches the end roller 31. This assures that the material will reach its final destination. The cover 24 also assures that no-one will be injured by stray particles. The cover is attached to the top most portion of the trays 11, 12 by rivets 25.

It is to be understood that the present invention is not limited to the sole embodiment described above, but encompasses any and all embodiments within the scope of the following claims.

I claim:

1. An apparatus having a truck end and a free end that can be attached to the rear of a truck to convey particulate material from said truck to a specific location comprising:
   at least two structural trays,
   each of said structural trays comprising at least two structural side bars,
   said structural side bars having roller means disposed therebetween,
   said structural side bars having a conveyor belt therebetween,
   said structural sides bars having a cover thereover,
   said structural trays being connected to one another by a folding joint,
   said folding joint being a pivotal joint,
   said truck end of said apparatus attaching to said truck by a pivotal attachment means,
   said free end having a motorized roller rotatably disposed between said structural bars of said structural tray around which said conveyor belt revolves,
   said motorized roller being powered by a hydraulic motor means,
   said truck end having a roller disposed between said structural side bars of said structural tray around which said conveyor belt revolves,
   at least one of said rollers being adjustable with respect to its longitudinal position on said apparatus allowing for minute adjustment of the tension on said conveyor belt during the life of said conveyor belt,
   one of said structural trays having two side hydraulic cylinders pivotally attached thereto,
   each of said side hydraulic cylinders attaching to said truck by at least one chain which is disposed around a post attached to said truck,
   said side hydraulic cylinders allowing for the lateral motion of said apparatus,
   a height hydraulic cylinder attached vertically to the rear of said truck,
   said height hydraulic cylinder attaching via a cable through a pulley assembly to a hook means,
   a fixed cable length having two ends,
   each of said ends of said fixed cable length having a loop,
   said hook means removably attaching to one of said loops of said fixed cable length.
   said loop opposite said loop attaching to said hook means removably attaching to a fixed hook means disposed on said structural tray furthest from said truck,
   wherein said height hydraulic cylinder adjusts the height of said apparatus from the ground,
   said structural tray closest to said truck having a crossbar disposed thereacross allowing for removable attachment to said hook means to fold said apparatus when necessary,
   said free end of said apparatus having a wheel support structure attached thereto,
   said wheel support structure having at least one wheel hub pivotally disposed thereon,
   said wheel hub having at least one tire means disposed thereon,
   said apparatus having a conveyor belt carrying means disposed thereunder at each location having one of said folding joints,
   said conveyor belt carrying means holding said conveyor belt from draggin on the ground when said apparatus is operating and folded,
   hydraulic fluid tubing,
   said hydraulic fluid tubing extending to and from said hydraulic side cylinders,
   said hydraulic fluid tubing extending to said hydraulic side cylinders being the side cylinder supply line,
   said hydraulic fluid tubing extending from said hydraulic side cylinders being the side cylinder return line,
   said hydraulic fluid tubing extending to and from said hydraulic motor means,
   said hydraulic fluid tubing extending to said hydraulic motor means being the hydraulic motor supply line,
   said hydraulic fluid tubing extending from said hydraulic motor means being hydraulic motor return line,
   said hydraulic fluid tubing extending to and from said height cylinder,
   said hydraulic fluid tubing extending to said height cylinder being the height cylinder supply line, and
   said hydraulic fluid tubing extending from said height cylinder being said height cylinder return line.

2. An apparatus having a truck end a free end that can be attached to the rear of a truck to convey particulate material from said truck to a specific location according to claim 1, wherein:
   said apparatus comprises two structural trays only.

3. An apparatus having a truck end and a free end that can be attached to the rear of a truck to convey particulate material from said truck to a specific location according to claim 1, wherein:
   said structural tray closest to said truck having said side hydraulic cylinders thereattached.

4. An apparatus having at truck end and a free end that can be attached to the rear of a truck to convey particulate material from said truck to a specific location according to claim 1, wherein:
   each of said side hydraulic cylinders having only one chain attaching said side hydraulic cylinder to said truck.

5. An apparatus having a truck end and a free end that can be attached to the rear of a truck to convey particulate material from said truck to a specific location according to claim 1, wherein:
   said hydraulic fluid tubing being flexible at each of said folding joints,
   said hydraulic tubing being flexible between the connection to said truck and the connection to said side hydraulic cylinders,
   said hydraulic tubing extending to and from said hydraulic motor means being rigid piping when attached to the side of said structural tray, and
   said hydraulic tubing extending to and from said hydraulic motor means being flexible at the connection to said hydraulic motor means.

* * * * *